US007025574B2

(12) United States Patent
Cremer et al.

(10) Patent No.: US 7,025,574 B2
(45) Date of Patent: Apr. 11, 2006

(54) PROCESS FOR ASSEMBLY OF AN ELECTRIC PUMP, AND A VIBRATION DAMPER FOR SUCH A PUMP

(75) Inventors: Hugues Cremer, Bastogne (BE); Christian Gerard Hillard, Talange (FR)

(73) Assignee: Delphi Technologies, Inc., Troy, MI (US)

( * ) Notice: Subject to any disclaimer, the term of this patent is extended or adjusted under 35 U.S.C. 154(b) by 319 days.

(21) Appl. No.: 10/430,180

(22) Filed: Apr. 29, 2003

(65) Prior Publication Data

US 2004/0005227 A1 Jan. 8, 2004

(30) Foreign Application Priority Data

Jun. 21, 2002 (FR) .................................. 02 07701

(51) Int. Cl.
*F16F 9/38* (2006.01)

(52) U.S. Cl. ................ 417/363; 417/423.3; 417/423.9; 417/423.14; 417/360

(58) Field of Classification Search ............. 417/423.3, 417/423.9, 423.14, 363, 360
See application file for complete search history.

(56) References Cited

U.S. PATENT DOCUMENTS 4,768,925 A * 9/1988 Geupel .................... 415/213.1
5,002,467 A * 3/1991 Talaski et al. .............. 417/363
5,165,867 A * 11/1992 Dockery ...................... 417/360
5,482,444 A 1/1996 Coha et al.
6,378,504 B1 * 4/2002 Horiuchi et al. ............ 123/509
6,401,695 B1 6/2002 Cooke

FOREIGN PATENT DOCUMENTS

| | | |
|---|---|---|
| DE | 4336574 | 5/1995 |
| EP | 0773362 | 5/1997 |
| EP | 0779947 | 6/1997 |

OTHER PUBLICATIONS

Copy of FR Search Report # 0207701 dated Mar. 10, 2003.

* cited by examiner

*Primary Examiner*—Timothy S. Thorpe
*Assistant Examiner*—Ryan Gillan
(74) *Attorney, Agent, or Firm*—Jimmy L. Funke

(57) ABSTRACT

An electric fuel pump includes a pump proper (1) having a pump body (2) that includes an induction orifice (3), a delivery orifice (4), and electrical terminals (5,6). A cage (7) is arranged around said pump body. A filtering element (15) is connected to the cage and communicates with the induction orifice. A tubular vibration damping element (16) is arranged about the cage. A pump casing (17) is assembled about the vibration damping element so that the vibration damping element is disposed between the pump casing and the cage to prevent contact.

10 Claims, 2 Drawing Sheets

PROCESS FOR ASSEMBLY OF AN ELECTRIC PUMP, AND A VIBRATION DAMPER FOR SUCH A PUMP

TECHNICAL FIELD

The present invention relates to a process for assembly of an electric pump, in particular an electric fuel pump, a vibration damper for such a pump and a pump obtained by this process.

BACKGROUND OF THE INVENTION

Such a fuel pump is used in particular in motor vehicles and is manufactured to be installed in a fuel trap arranged within a fuel tank.

A current problem with pumps of this type results from the vibrations produced by the pump and which, in the specific application mentioned, are transmitted to the fuel tank and create an annoying background noise.

In a known pump, an attempt has been made to palliate this disadvantage by giving the pump a geometry intended to attenuate the transmission of the vibrations by the elements forming the pump. The pump proper includes a pump body provided with an induction orifice, with a delivery orifice and with electrical terminals to supply it with electricity. This pump body is connected at one of its ends to a strainer which communicates with the induction orifice. A casing is arranged around the pump body and serves to protect this and to connect it to a fuel trap.

In order to reduce the transmission, in this pump, of vibrations from the pump body to the tank via the pump casing, a cage of semi-rigid plastics material is arranged on the pump body before the casing is mounted on it. This cage includes around its whole periphery uniformly spaced longitudinal apertures. By means of this specific geometry, transmission of vibrations is reduced. Moreover, this cage is also used to fix the strainer to this assembly.

However, it would be desirable to obtain more efficient damping of the vibrations produced by the pump. In this regard, another fuel pump is known provided with elastic suspensions arranged at the ends of the pump body. Another pump is also known in which the solution consists of connecting the pump body to the pump casing by means of a plurality of ribs of elastic material uniformly arranged around the periphery of the pump body.

Even if these latter devices are generally satisfactory from the point of view of vibration damping, they are relatively complex due to the fact that they include a large number of parts and are relatively bulky. What is more, they are expensive to manufacture.

SUMMARY OF THE INVENTION

The invention has the aim of remedying the disadvantages mentioned above by proposing a process for assembly of a fuel pump which results in a pump, the vibration damping device of which is extremely simple, reliable and efficient, and which in addition is not bulky.

One of the objects of the invention is a process for assembly of an electric pump, in particular a motor vehicle fuel pump, comprising the following phases:

(a) a pump proper is formed including a pump body provided with an induction orifice, a delivery orifice and electrical terminals to supply it with energy;

(b) a cage is arranged around the said pump body;

(c) a filtering element is fixed to one of the ends of the said pump body by connecting it to the said cage so that the said induction orifice communicates with the said filtering element; and (d) the assembly thus obtained is introduced into a pump casing and they are connected one to the other.

This process is characterised by the fact that, after phase (c) and before phase (d), a tubular vibration damping element is arranged on the said cage, the said tubular element also forming a sole connection organ between the said cage and the said pump casing.

In accordance with other characteristics of the invention:

the said damping element is locked in rotation on the said cage;

the said damping element is connected to the said pump casing by snap engagement.

Another object of the invention is a vibration damper for implementation of the process defined above, characterised by the fact that the said damper comprises an elastic tubular element including on its internal face protuberances able to co-operate with apertures provided in the cage so as to form means for locking the said tubular element in rotation relative to the said cage.

In accordance with other characteristics of the invention:

the said protuberances are formed by ribs, the length of which is suited to the length of the said apertures so as to form means for axial locking of the said tubular element relative to the said cage;

the said tubular element includes on its external face first snap engagement means able to co-operate with second snap engagement means on a casing in which the said tubular element is able to be received;

the said first snap engagement means include two diametrically opposed snap engagement organs on the external face of the said tubular element and presenting a respective outwardly directed hook able to project through a respective opening provided in the said casing to form the said second snap engagement means;

the tubular element is made of rubber.

Yet another object of the invention is an electric fuel pump obtained in accordance with the process of the invention.

Yet another object of the invention is an electric fuel pump including the damper in accordance with the invention.

BRIEF DESCRIPTION OF THE DRAWINGS

Other characteristics and advantages of the invention will become apparent from the following description of a non-limiting embodiment of the invention, with reference to the attached figures in which.

DESCRIPTION OF THE PREFERRED EMBODIMENT

In the figures, identical or equivalent elements will bear the same reference marks.

Figures 1, 2, 3:
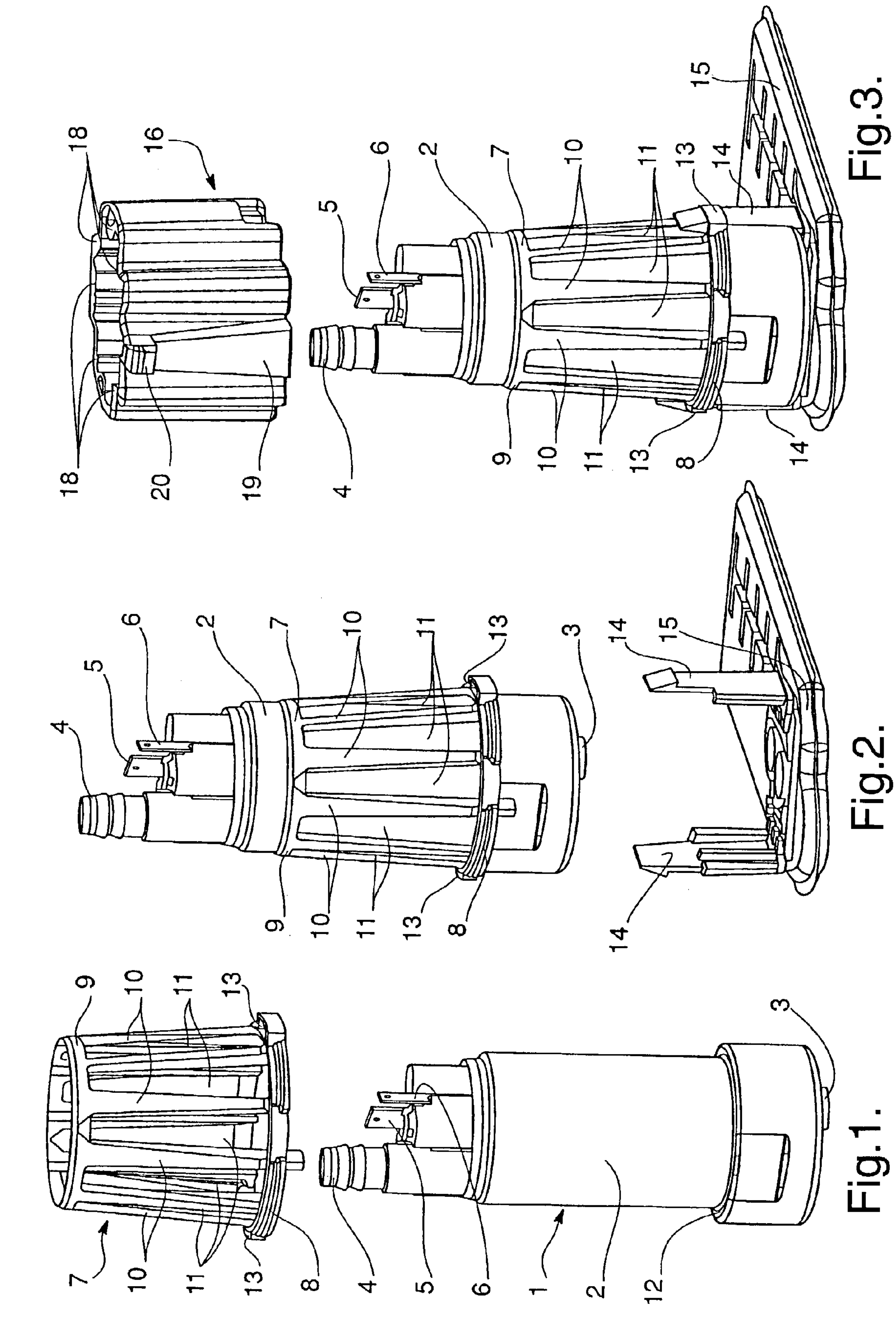
FIG. 1 is a perspective view showing a cage ready to receive a pump body in a first phase of the assembly process in accordance with the invention.
FIG. 2 is a perspective view showing the pump body received in the cage of FIG. 1, the latter being ready to co-operate with arms for fixing a filtering element in a second phase of the assembly process in accordance with the invention.
FIG. 3 is a perspective view showing the pump body received in the cage which is connected to the filtering element and ready to receive a tubular damping element in accordance with the invention in a third phase of the assembly process in accordance with the invention.

FIG. 1 shows a pump proper I which will not be described in detail since it is itself well-known to the man skilled in the art. The pump includes a generally cylindrical pump body 2 having at one of its ends an induction orifice 3 and at its opposite end a delivery orifice 4. In the pump body 2 is housed an electric motor (not shown) which is supplied with an electric current through electrical terminals 5, 6 projecting at one of the ends of the pump body 2 and which are connected to a source of electrical energy (not shown).

On subsequent assembly of the pump from the pumping unit shown in FIG. 1, a cage 7, preferably made of a semi-rigid plastics material, is arrange around the body 2. This cage is formed by a lower ring 8 and an upper ring 9 connected to each other by longitudinal rods 10 uniformly spaced so as to form longitudinal apertures 11, also uniformly spaced, between them.

The lower ring 8 of the cage 7 is able to come into abutment against a circular shoulder 12 at the lower end of the pump body 2. FIG. 2 shows the cage 7 mounted on the pump body 2. The lower ring 8 of the cage 7 also includes on its periphery two diametrically opposed U-shaped structures 13, which on their outer faces form projections and on their inner faces form housings able to receive snap engagement legs 14 of a filtering element in the form of a strainer 15.

FIG. 2 shows the strainer 15 before its assembly with the cage and FIG. 3 shows these elements after assembly.

FIG. 3 also shows a tubular element 16 in accordance with the invention able to be arranged on the cage 7 in order to form a vibration damping element. This damping element is made of an elastic material such as rubber.

Figure 5:
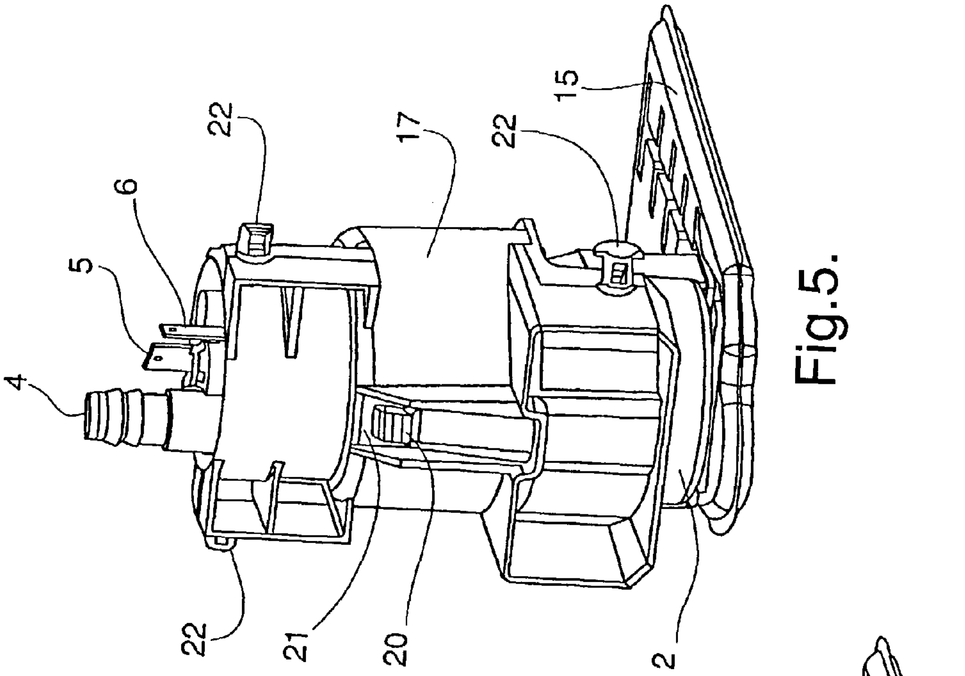
FIG. 5 is a perspective view showing the pump body received in the cage which is connected to the filtering element and surrounded by the tubular damping element which, in its turn, is surrounded by the pump casing to thus form the pump in accordance with the invention.
Figure 4:
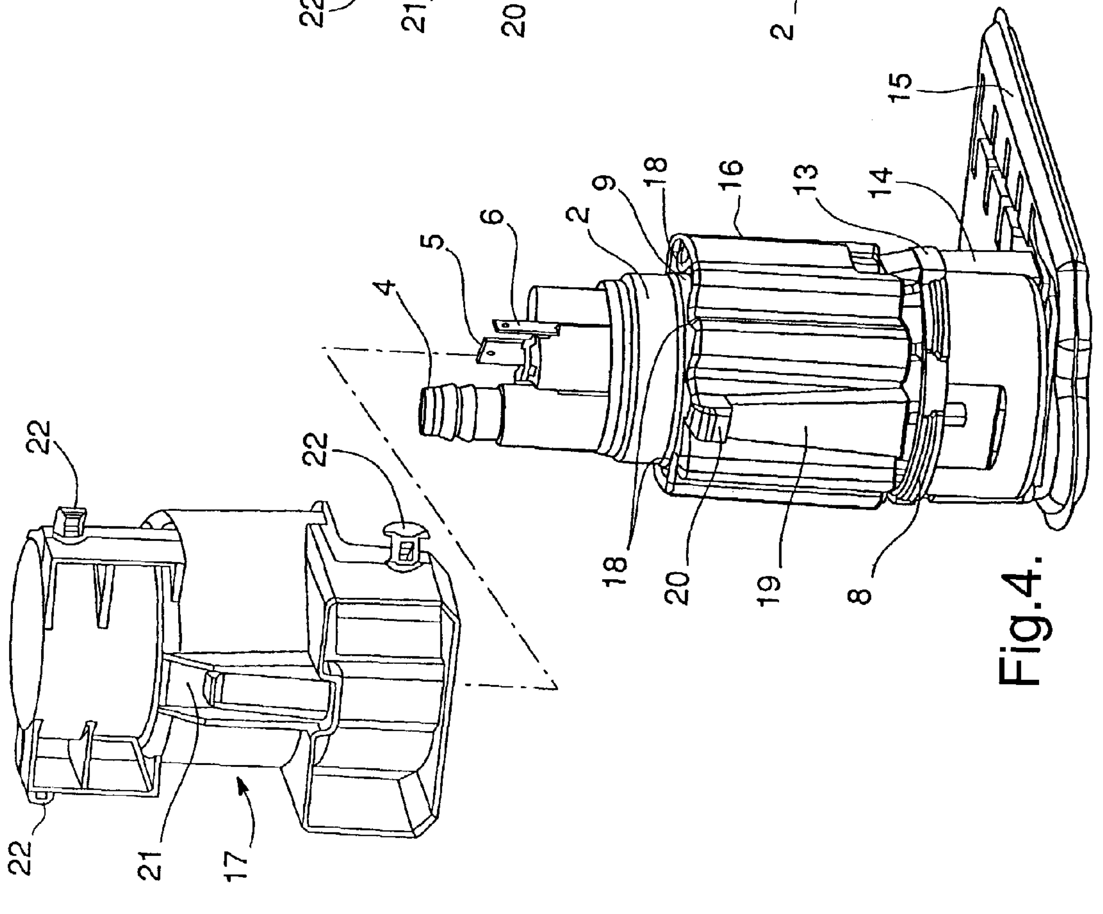
FIG. 4 is a perspective view showing the pump body received in the cage which is connected to the filtering element and surrounded by the tubular damping element of FIG. 3 to receive a pump casing in a fourth phase of the assembly process in accordance with the invention.

This tubular element 16 also forms a sole connection organ between the cage 7 and a pump casing 17 shown in FIGS. 4 and 5. This pump casing 17 completes the assembly of the pump which then has the appearance shown in FIG. 5 and which is ready to be installed in a fuel trap (not shown) inside a fuel tank (not shown).

The tubular elastic element 16, forming the vibration damper between the cage 7 and the pump casing 17, includes on its internal face protuberances 18 able to co-operate with the apertures 11 of the cage 7 so as to form means for locking the tubular element 16 in rotation relative to this.

These protuberances 18 are preferably formed by longitudinal undulations forming ribs, the length of which is suited to the length of the apertures 11 of the cage 7 so as to form axial locking means of the tubular element 16 relative to the cage.

Moreover, the tubular element 16 includes on its external face first snap engagement means able to co-operate with second snap engagement means provided on the pump casing 17. The first snap engagement means include two diametrically opposed snap engagement organs 19 on the external face of the tubular element and which respectively present an outwardly directed hook 20 able to project through a respective opening 21 provided in the pump casing 17. On introduction of the assembly shown at the bottom of FIG. 4 into the pump casing shown at the top of this same figure, the hooks 20 are firstly compressed against the internal wall of the casing, before re-adopting their initial shape projecting outwardly through the openings 21.

The pump casing 17 is provided, in conventional manner, with organs 22 for fixing the assembly thus obtained, for example in a fuel trap in a tank.

By means of the invention, a pump is thus obtained provided with a particularly simple vibration damping device, since this device only includes one single piece which also functions as a connecting piece and which, at the same time, is very easy to mount. Moreover, the other elements used in the pump are standard parts, which makes implementation of the invention particularly economical.

Of course, the invention is not limited to the example illustrated and described, but can be applied to any pump intended to pump a fluid.

The invention claimed is:

1. An electric fuel pump comprising, a pump proper including a pump body having an induction orifice, a delivery orifice, and electrical terminals;

a cage around said pump body;

a filtering element connected to said cage such that the filtering element is fixed to one end of said pump body with said induction orifice communicating with the filtering element, a tubular vibration damping element arranged about the cage, and a pump casing assembled about the vibration damping element such that the vibration damping element is disposed between the pump casing and the cage to prevent contact therebetween.

2. An electric fuel pump as claimed in claim 1, wherein the vibration damping element comprises an elastic tubular element having a protuberance on an internal face, and the cage comprises an aperture for receiving said protuberance, thereby locking the said tubular element against rotation relative to the said cage.

3. A process for assembly of an electric pump comprising:

providing a pump proper including a pump body having an induction orifice, a delivery orifice, and electrical terminals;

arranging a cage around said pump body;

connecting a filtering element to said cage such that the filtering element is fixed to one end of said pump body with said induction orifice communicating with the filter in element, arranging a tubular vibration damping element about the cage, assembling a pump casing about the vibration damping element such that the vibration damping element is disposed between the pump casing and the cage to prevent contact therebetween.

4. An assembly process as claimed in claim 3, wherein the step of arranging a tubular vibration damping element about the cage includes locking said vibration damping element onto said cage to prevent rotation.

5. An assembly process as claimed in claim 3, wherein the step of connecting the vibration damping element to the pump casing includes projecting a hook of said vibration damping element through an opening in the pump casing to form a snap connection.

6. An assembly process as claimed in claim 3, wherein the vibration damping element comprises an elastic tubular element having a protuberance on an internal face, and the cage comprises an aperture for receiving said protuberance, thereby locking the said tubular element against rotation relative to the said cage.

7. An assembly process as claimed in claim 6, wherein the protuberance is a rib.

8. An assembly process as claimed in claim 6, wherein the tubular element includes a first snap engagement means on an external face, and said pump casing includes a second snap engagement means that co-operates with said first snap engagement means to form a snap connection therebetween.

9. An assembly process as claimed in claim 8, wherein the first snap engagement means includes two diametrically opposed hooks, and wherein the second snap engagement means includes openings for receiving said hooks.

10. An assembly process as claimed in claim 6, wherein the tubular element is made of rubber.

* * * * *